United States Patent [19]

Nederbragt

[11] 3,870,021

[45] Mar. 11, 1975

[54] AUTOMATIC CONTROL FOR MILKING MACHINE SUPPORT STRUCTURE

[75] Inventor: Frits W. Nederbragt, Petaluma, Calif.

[73] Assignee: Ross-Holm, division of Holm Tractor & Equipment Company, Petaluma, Calif.

[22] Filed: Nov. 29, 1973

[21] Appl. No.: 420,205

[52] U.S. Cl. ............................................ 119/14.13
[51] Int. Cl. .............................................. A01j 7/00
[58] Field of Search ............. 119/14.1, 14.13, 14.08

[56] References Cited
UNITED STATES PATENTS

| | | | |
|---|---|---|---|
| 2,775,224 | 12/1956 | Rawson et al. | 119/14.13 |
| 3,115,116 | 12/1963 | Schilling et al. | 119/14.08 |

Primary Examiner—Hugh R. Chamblee
Attorney, Agent, or Firm—Limbach, Limbach & Sutton

[57] ABSTRACT

An automatic control for the support system of a milking cluster which includes a milking cluster and an actuator which provides a lifting force for it, a force sensor between the milking cluster and the support actuator for measuring the pulling force exerted on the udder by the milking cluster and means for energizing the actuator to raise or lower the cluster until the signal from the pulling force sensor indicates that the pulling force exerted by the cluster on the udder is within a predetermined range and for maintaining the pulling force within this predetermined range despite fluctuations in the height of the udder to thereby selectively stabilize the pull exerted by the milking cluster on the cow's udder.

18 Claims, 7 Drawing Figures

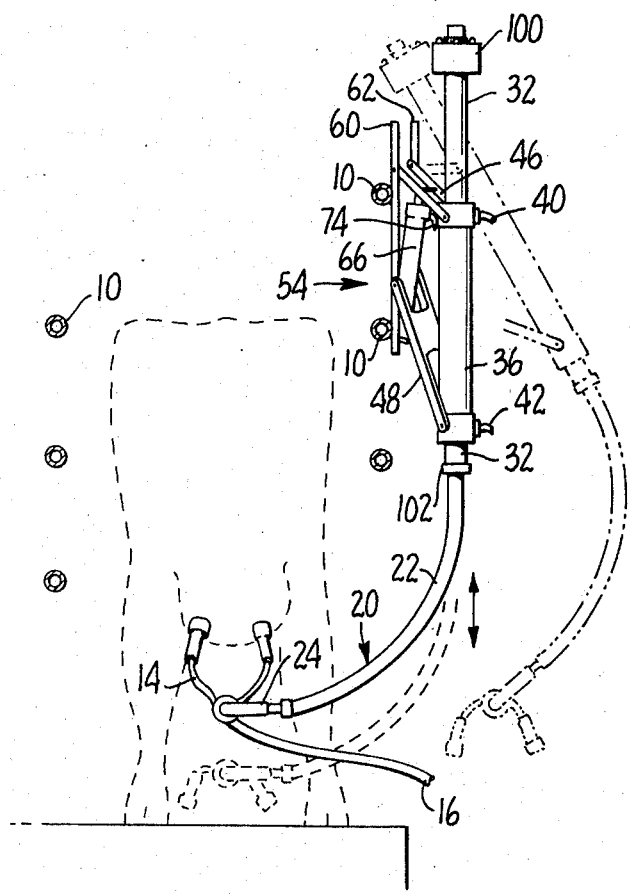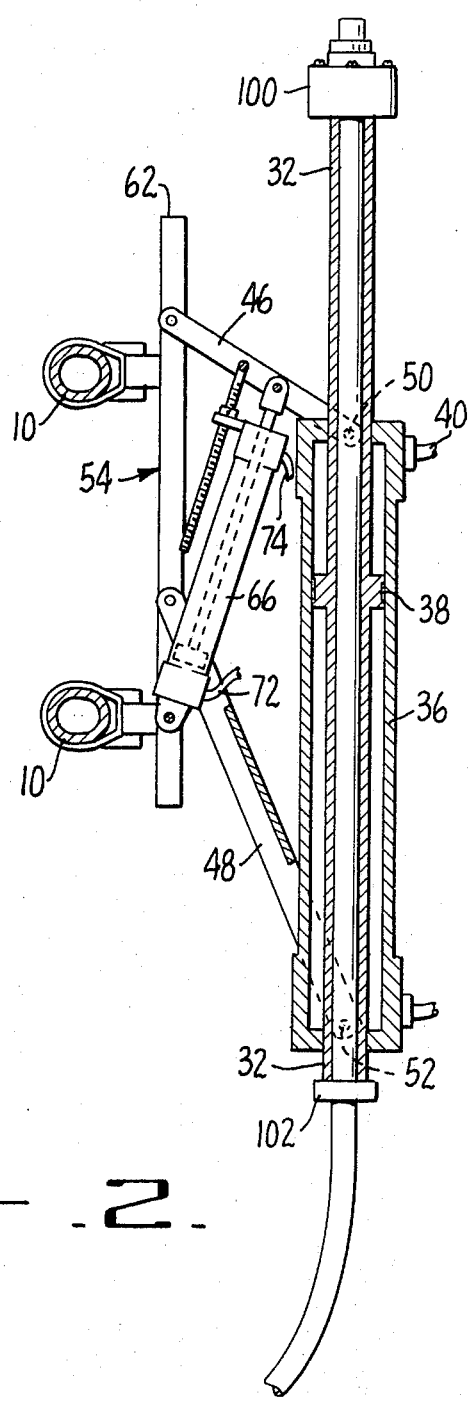
FIG. 1.
FIG. 2.

AUTOMATIC CONTROL FOR MILKING MACHINE SUPPORT STRUCTURE

BACKGROUND OF THE INVENTION

The present invention relates to an automated system for the milking of cows and more particularly to a control system for the milking cluster servo support structure of such a system.

In several different types of automated milking systems a milking cluster or a teat cluster which attaches to the udder of a cow is supported on a vertical actuator, such as a hydraulic or a pneumatic cylinder or an electric motor and lead screw arrangement. One such system is disclosed in U.S. Pat. No. 3,593,687. In the system disclosed in that patent, a support arm for the milking cluster is suspended from the wall of the stall by a first hydraulic cylinder linkage which swings the arm from a milking position underneath the cow to a laterally withdrawn position outside of the stall. A second hydraulic cylinder permits the arm to be moved vertically in the milking position. The vertical cylinder is also activated at this time to move the arm upwardly as it swings out of the stall.

One problem with such a system is that the cow's udder moves horizontally and vertically during the milking. For example, heifers' udders will generally shrink and move the teats up when the milking is finished whereas in older cows the teats are often lowered when the udder relaxes at the end of a milking. For some cows it is desirable to maintain the vertical position of the cluster with respect to the udder such that the cluster exerts a steady pull on the udder throughout most of the milking period. Assuming that the operator initially sets the height of the milking cluster for a desired pull on the udder it is likely to need readjustment during the course of the milking. This pulling force, however, must be adjustable for any given height of the cluster. Furthermore, younger cows are better trained with less weight than would be required for an older cow. It may also be desirable, in some cases, to increase or decrease the pulling force towards the end of the milking process. For example, to prevent the teat suction cups from "crawling" up on the teat, thereby causing irritation of the teat, the pulling force should be increased toward the end of the milking.

The above described prior art system does not provide for automatic sensing of the change in pull due to vertical movement of the cow's udder nor does it provide for a stabilized pull. If the operator initially positions the milking cluster too high, the entire weight of the cluster arm and the cluster is supported by the cylinder, thus putting very little pull on the cow's udder. If the cylinder is adjusted too low, the cow will experience a substantial pull of the udder and carry a greater part of the weight of the cluster and the supporting arm. This, in turn, reduces the weight of the arm and the cluster as reflected on the cylinder. It is, therefore, desirable to automatically keep the pull on the cow's udder constant and raise or lower the cluster to allow for the proper milking angle during the complete milking and also to allow for increases or even decreases in the pulling force at the end of the milking.

SUMMARY OF THE INVENTION

The above and other disadvantages are overcome by the present invention of an improved support system for a milking cluster of the type in which the cluster is raised or lowered by an actuator, wherein the improvement comprises means for sensing a change in the pulling force exerted by the cluster on the cow's udder and for producing one or more output signals when the pulling force either exceeds or falls below a selected range of pulling forces and control means responsive to the output signals for energizing the actuator to reposition the cluster with respect to the cow's udder until the pulling force exerted by the cluster is within the predetermined range.

In one preferred embodiment, the actuator is a hydraulic piston in the form of a hollow sleeve fitted loosely and coaxially about a cluster support arm and the means for sensing the change in cluster pulling force includes a common electrode supported on the hollow sleeve and a plurality of resilient electrodes attached by a support to the cluster support arm at different, predetermined distances from the common electrode. The control means is connected to the common electrode and selectively to a pair of the plurality of electrodes. The control means includes solenoid operated valves and relays connected in series with the common electrode and one of the selected pair of electrodes across a power supply in an arrangement such that the hollow sleeve raises the cluster support arm until a first one of the selected pair of electrodes contacts the common electrode, thereby indicating that the cluster is exerting a certain maximum pull on the udder, and then halts the servo sleeve, and the cluster support arm in that position. If the pulling force increases above this predetermined maximum, thereby disconnecting the first one of the selected pair of electrodes from the common electrode the control means energizes the proper solenoid operated valve to activate the sleeve and the cluster support arm in an upward direction until the first and common electrodes again come into electrical contact with each other after which the sleeve is stopped. If the pulling force exerted by the cluster on the cow's udder drops below a predetermined minimum value the second one of the selected pair of electrodes makes electrical contact with the common electrode. In response to this, the control means activates the sleeve to move the cluster support arm in the downward vertical direction until the second and common electrodes are separated.

In order to accomplish the above described operation, the energizing coil of the solenoid valve which causes the sleeve to move upwardly is connected to the electrical power supply through a pair of normally closed contacts operated by a first relay whose coil is connected in series with the common electrode and the first one of the pair of electrodes across an electrical source. The energizing coil of the solenoid valve which causes the sleeve to move downwardly is connected in series with the common electrode and the second one of the pair of electrodes across an electrical source.

In the preferred embodiment, the supports for the common electrode and the plurality of electrodes are spring biased apart from each other to provide a compensation for the weight of the cluster and the cluster support arm. The selection of which electrodes of the pulling force sensor are to activate the control means is accomplished by selecting the movable contact positions of a pair of rotary, gang switches. Thus, the pulling force exerted by the cluster on the udder of any cow, without regard to the cow's height, is preselected by the operator prior to the milking.

It is therefore an object of the present invention to provide an automatic control for the milking cluster support mechanism of an automatic milking system which will maintain a preselected, constant pull on the teats of the cow being milked;

It is another object of the present invention to provide a weight sensitive control for an automatic milking cluster support mechanism;

It is still another object of the invention to provide a control system which allows for a selected amount of pull on the cow's udder by a milking cluster, irrespective of its height, by automatically controlling the milking cluster actuator support mechanism in response to the sensed pulling force;

It is still a further object of the invention to provide an automated milking system in which the pull exerted on the cow's udder by the teat cluster during the milking may be altered either manually or in response to a control signal representative of a period of time, milk quantity, milk flowrate, or any other selected parameter of the milking process.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a vertical sectional view through a milking stall showing one embodiment of the apparatus of this invention suspended from a side wall of the stall;

FIG. 2 is a vertical sectional view on a larger scale showing the interior parts of the hydraulic cylinder support apparatus of FIG. 1;

DESCRIPTION OF CERTAIN PREFERRED EMBODIMENTS

Figure 3:
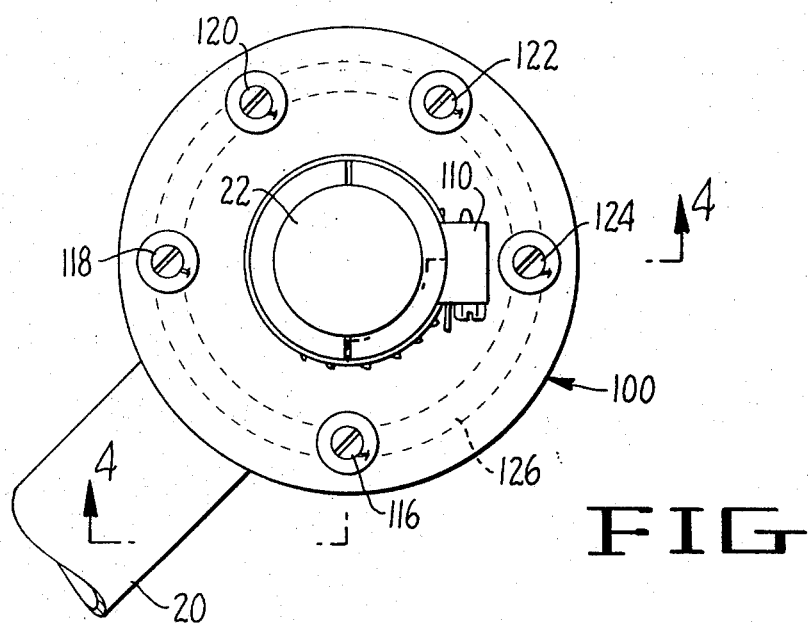
FIG. 3 is a further enlarged top view of the force sensing portion of the structure of FIG. 2.
Figure 4:
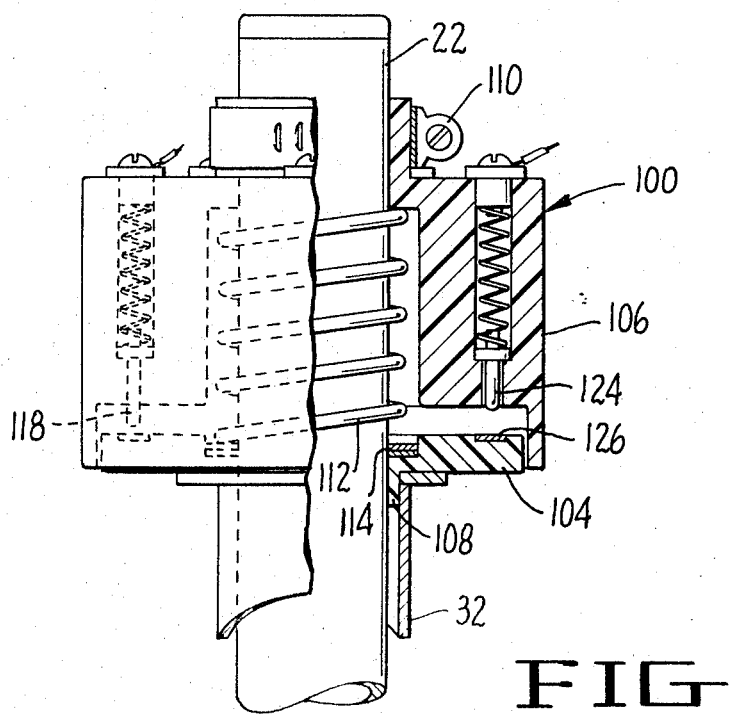
FIG. 4 is a further enlarged sectional side view of the pulling force sensing mechanism taken generally along the lines 4—4 of FIG. 3.

Referring now more particularly to FIG. 1, the system described in U.S. Pat. No. 3,593,687 as modified by the present invention is illustrated. For convenience and clarity, the basic reference numerals as were used in that patent have been applied in this description. The apparatus is adapted to be suspended from pipe rails 10 which form the side rails of the milking stall having a floor 12, thereby providing a milking area for a cow. A milking claw 14 is positioned adjacent to the milking stall and is provided with a pipe 16 by which milk is conveyed away from the milking claw. Although the term "claw" is used throughout this description, it should be apparent that in other embodiments of the invention a teat cluster of any type may be substituted for the claw with the same beneficial results.

The claw 14 is attached to the cow's udder and partially supported on the end of an arm 20 which has an upper rigid section 22 and a pivoted link 24. As best seen in FIG. 2, the upper rigid section 22 of the arm 20 extends upward telescopically through a sleeve bearing 102 and a sleeve 32. A pulling force sensing device 100 is attached to the portion of the rigid section 22 above the top of the sleeve 32. A hydraulic cylinder 36 surrounds the sleeve 32. A piston ring 38 is integrally formed about the sleeve 32 inside of the hydraulic cylinder 36 so that the sleeve 32 may be moved longitudinally in the hydraulic cylinder 36 in response to the delivery of hydraulic fluid under pressure to a pair of upper and lower conduits 40 and 42, respectively, in the hydraulic cylinder 36.

The hydraulic cylinder 36 is supported on the side walls 10 of the milking stall by means of a pair of yokes 46 and 48 which are pivotally connected at their outer ends to the hydraulic cylinder 36 at pivot points 50 and 52, respectively.

The support frame 54 includes a pair of rods 60 and 62 which are attached at angles to the pipes 10 so that the pivot axes of the yokes 46 and 48 are not parallel to the pipe 10 but instead are inclined inwardly toward the forward end of the stall so that the arm 20 and the sleeve 32 swing toward the rear of the stall as they swing inwardly. This arrangement permits the claw support structure to enter the stall from a position substantially forward of the cow's rear legs and to move to the area between the rear legs for sufficient support of the claw during milking.

A second hydraulic cylinder 66 is pivotally connected at one end to the upper yoke 46 and at its other end to the frame 54. The hydraulic cylinder 66 contains an internal piston and piston rod as is conventional in the art so that the cylinder expands and contracts in response to the delivery of hydraulic fluid from a pressurized source 166 (FIG. 5), such as a pump, to lower and upper conduits 72 and 74, respectively. As is apparent in the hidden line drawing of FIG. 1, the apparatus may be operated to swing the support arm 20 and the claw 14 from a milking position, illustrated in solid line, to a retracted position, illustrated in phantom line, in response to the delivery of hydraulic fluid from the source 166 to the lower conduit 72 of the hydraulic cylinder 66, and in the opposite direction by reversing the flow of hydraulic fluid through the cylinder.

The vertical position of the support arm 20 and the claw 14 is adjusted both in the milking and the withdrawn positions by delivering hydraulic fluid from the source 166 through one or the other of the conduits 40 and 42 on the hydraulic cylinder 36 to exert an appropriate force on the servo sleeve. Thus, when the arm 20 is first swung from the withdrawn position to the milking position, the hydraulic cylinder 36 may thereafter be actuated to adjust the height of the claw 14 to the height of the udder of the cow to be milked.

Referring now more particularly to FIGS. 2-5, the pulling force sensor 100 has a bottom portion 104 and a top portion 106. The bottom portion 104 has a protruding inner lip which acts as a sleeve bearing 108 between the upper end of the sleeve 32 and the arm 22. Together the sleeve bearings 108 and 102 center the arm 22 in the sleeve 32. These two bearings 108 and 102 allow the arm 22 to slide up or down through the cylinder shaft 32 with a minimum of frictional drag. For this reason, the total weight of the arm 20 and the claw 14 is reflected almost entirely on the sensor 100.

The top part 106 of the sensor is clamped directly to the top end of the arm 22 with a clamp 110. The two parts 104 and 106 are coaxial with the sleeve 32 and the arm 22, and are free to move with respect to each other. These are preferably made of an electrically insulating material such as plastic. A coil spring 112 is fitted over the upper end of the arm 22 and is pressed between the upper and lower parts 106 and 104, respectively, of the weight sensor 100. The spring 112 biases them apart with a force which counter-balances the weight of the arm 20 and the milking claw 14. With no external force exerted on the claw 14, the gap between the parts 104 and 106 is just closed. When the combined weight of the arm 20 and the claw 14 is partially supported by the cow's udder through the claw 14, the spring 112 will push the parts 104 and 106 apart by a predetermined amount. The bottom end of the spring 112, as viewed in FIG. 4, bears against a plurality of washers 114 slipped over the end of the arm 22 and positioned in an annular groove in the part 104. The washers 114 may be added or subtracted in order to adjust for variations in the spring force in manufacturing.

The upper part 106 of the weight sensor 100 is provided with a plurality of spring biased electrodes 116, 118, 120, 122 and 124 which are fitted into the part 106 in a manner such that they are spaced at different heights above an axially centered annular electrode 126 mounted in the top surface of the bottom portion 104 of the sensor 100. The electrodes 116–124, inclusive, are arranged in a circle about the longitudinal axis of the upper arm 22. The electrode 116 is spring biased to always press against the common electrode 126. As will be explained in greater detail hereafter, the common electrode 126 is supplied with electrical power through the electrode 116. The lower tip of the electrode 118 extends closer to the common electrode 126 than the tip of the electrode 120 which, in turn, is closer to the common electrode than the tip of the electrode 122. The tip of the electrode 122 is closer to the common electrode 126 than the electrode 124. The tips of the electrodes 118–124, inclusive, are thus at staggered heights with respect to the common electrode 126 to provide separate electrical signals at different levels of compression of the spring 112. The different levels of spring compression are directly related to the pulling force exerted by the claw 14 on the cow's udder, which is transmitted to the sensor 100 through the arm 20.

In some embodiments, one of the parts 104 or 106 is provided with an internal camming surface which bears against the electrodes 118–124 so that by rotating the parts 104 and 106 with respect to each other the spacings of the electrodes 118–124 with respect to the common electrode 126 may be conveniently adjusted.

Figure 5:
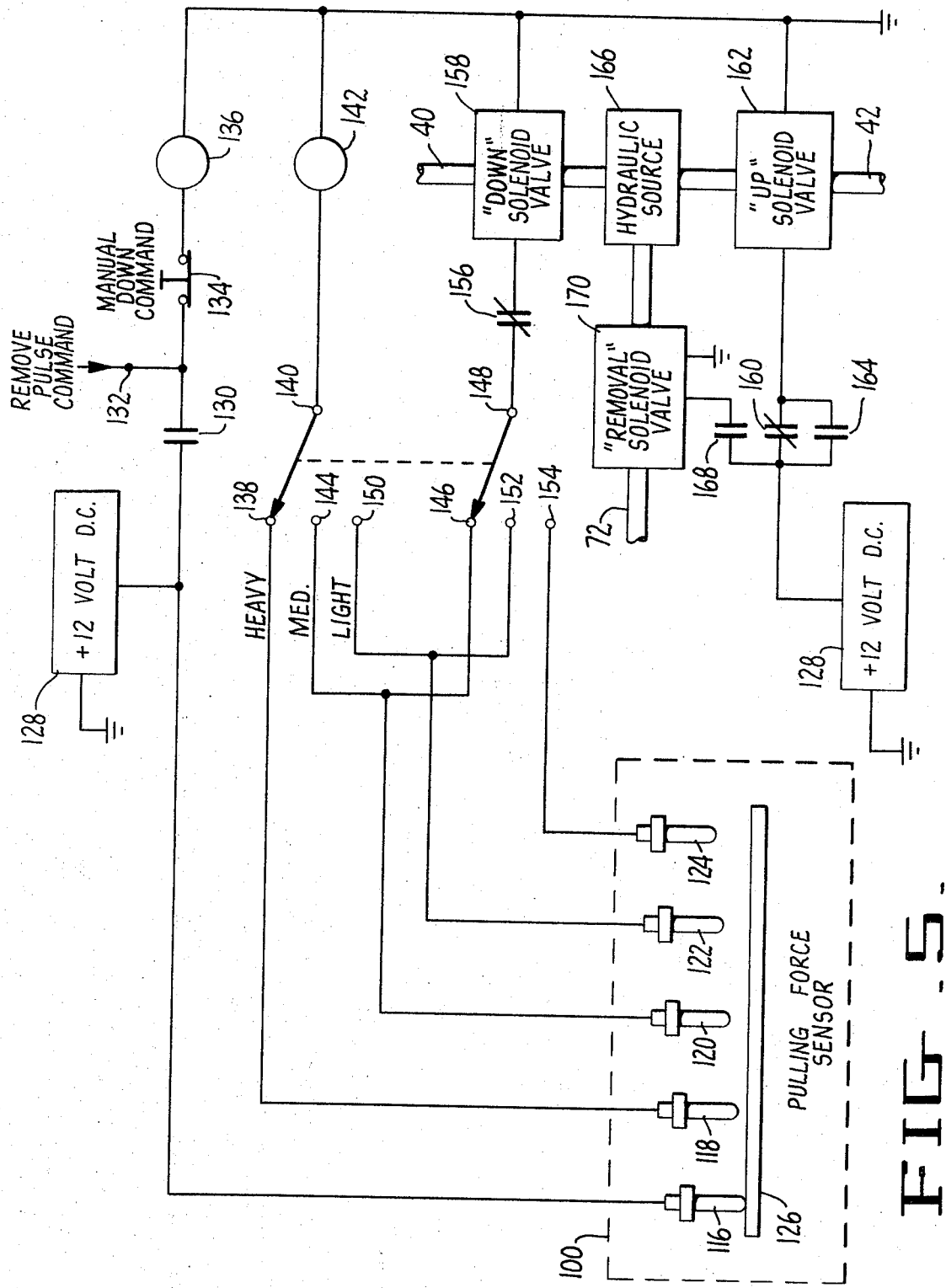
FIG. 5 is a schematic diagram of the electromechanical control for the embodiment of FIG. 1.

Referring now more particularly to FIG. 5, an electromechanical system is illustrated wherein the electrical signals derived from a selected pair of the electrodes 118–124 provide a high and a low limit of pulling force for controlling the position of the sleeve 32. The electrode 116 is connected to a +12 volt direct current, grounded voltage source 128 and to one contact of a pair of normally open relay contacts 130. The other contact of the pair of relay contacts 130 is connected to an input terminal 132 and to one contact of a single pole, single throw, normally closed, pushbutton switch 134. The other contact of the switch 134 is connected through the coil of the relay 136 to the circuit ground. The relay 136 operates the contacts 130

The electrode 118 is connected to an end terminal 138 of a three position switch 140. The moving contact arm of the switch 140 is connected through the coil of a relay 142 to the circuit ground. The electrode 120 is connected to the middle terminal 144 of the switch 140 and to an end terminal 146 of a three position switch 148. The electrode 122 is connected to the other end terminal 150 of the switch 140 and to the middle terminal 152 of the switch 148. The electrode 124 is connected to the other end terminal 154 of the switch 148. The moving contact arms of the switches 140 and 148 are ganged together so that when the moving arm of the switch 140 is in contact successively with the terminals 138, 144 and 150 the moving contact arm of the switch 148 will simultaneously be in contact with the terminals 146, 152, and 154, respectively.

The moving contact arm of the switch 148 is connected through a pair of normally closed relay contacts 156, which are operated by the relay coil 136, to a "down" solenoid valve 158. The other terminal of the down solenoid valve 158 is connected to the circuit ground. The +12 volt grounded source 128 is also connected through a pair of normally closed relay contacts 160 to one terminal of an "up" solenoid valve 162 whose other terminal is connected to the circuit ground. The relay contacts 160 are operated by the relay coil 142. A pair of normally open relay contacts 164 are connected in parallel with the relay contacts 160. The relay contacts 164 are operated by the relay coil 136. The valves 158 and 162 are each connected between a hydraulic source 166 and the upper and lower conduits 40 and 42, respectively, of the hydraulic cylinder 36.

In operation, the switches 140 and 148 give three ranges of milking claw pulling force: heavy, medium and light. In the heavy mode of operation, the electrode 118 is the top pulling force limit and the electrode 120 is the low pulling force limit. Since the electrode 118 is the closest to the common electrode 126 (other than the electrode 116 which is in constant contact with the common electrode 126) the electrode 118 requires the least amount of spring compression in order to be put in contact with the electrode 126. The least amount of compression of the spring 112 corresponds with the least amount of weight reflected on the sensor 100, and therefore a larger part of the combined weight of the arm 20 and the claw 14 is supported by the cow's udder, i.e., the pull on the udder exerted by the claw 14 is the largest of the selectable values. The electrode 120 is spaced slightly further from the common electrode 126 and therefore requires a greater amount of spring compression which corresponds to a lesser amount of pull on the cow's udder.

Assuming that the operator has selected the heavy mode of operation and has connected the cups on the milking claw 14 to the cow's udder and further assuming that the claw support arm 20 is supported by the sleeve 32 at the right height to produce a pulling force reflected on the sensor 100 such that the electrode 118 is in contact with the common electrode 126 but the electrode 120 is not in contact with the electrode 126, power from the source 128 is supplied through the electrodes 116, 126 and 118 and the switch 140 to energize the coil of the relay 142. When the relay coil 142 energizes, the normally closed contacts 160 are opened and the initially energized "up" solenoid valve 162 is closed. The "down" solenoid valve 158 is also closed because the electrode 120 is not in contact with the common electrode 126. At this point the sleeve 32 holds the arm 20 in a fixed position between the limits defined by the position of the electrodes 118 and 120 which correspond to a predetermined range of pulling force on the cow's udder reflected through the arm 20 to the sensor 100.

If the cow's udder should rise slightly, an upward force is exerted on the claw 14 and the arm 20, and correspondingly, a greater downward pulling force is exerted on the udder by the claw 14. This decreases the amount of weight borne by the sensor 100 and the electrode 118 becomes disconnected from the common electrode 126. Power to the coil of the relay 142 is thereby interrupted and the relay contacts 160 are closed to apply power to open the "up" solenoid valve 162. The opening of the solenoid valve 162 allows hydraulic fluid under pressure from the source 166 into the conduit 42 to thereby act against the piston-ring 38 and drive the sleeve 32 upwardly until the electrode 118 is again connected with the common electrode 126, thereby opening the relay contact 160 in the manner described above and halting the upward movement of the hydraulic cylinder sleeve 32. The selected maximum pulling force is thus re-established at a new vertical position of the claw 14.

Conversely, if the cow's udder should drop slightly, thereby increasing the weight borne by the sensor 100 until the electrode 120 comes into contact with the common electrode 126, power is supplied from the source 128 through the normally closed relay contacts 156 to energize the "down" solenoid valve 158. When the "down" solenoid valve 158 is energized, it opens and allows pressurized hydraulic fluid from the source 166 into the conduit 40 to exert a downward force on the top side of the piston-ring 38 of the sleeve 32. The sleeve 32 drops the arm 20 under this force until the electrode 120 is no longer in contact with the common electrode 126, thereby re-establishing the selected minimum pulling force on the cow's udder by the claw 14.

For a medium amount of pull on the udder, the moving contact of the switch 140 is connected to the terminal 144 and the moving contact of the switch 148 is connected to the terminal 152. In such case, the electrode 120 is the top pulling force limit and the electrode 122 is the bottom or low pulling force limit. For a light pull the moving contact arm of the switch 140 is connected to the terminal 150 and the moving contact arm of the switch 148 is connected to the terminal 154. In this case, the electrode 122 represents the top limit and the electrode 124 represents the low limit.

In some embodiments, a milk flow sensor (not shown) is provided which generates a Remove Pulse Command signal when the milk flow from the milking claw ceases or drops below a predetermined amount. The Remove Pulse Command signal is applied to the input terminal 132 of the electromechanical system and thereby energizes the coil of the relay 136. The energization of the relay coil 136 closes the normally open contacts 130 and supplies current from the source 128 to the relay coil 136, thereby "latching" the relay coil 136 into an energized state which is maintained until the normally closed pushbutton switch 134 is depressed. When relay coil 136 is thus energized, the contacts 156, which are normally closed, are opened so that the down solenoid valve 158 is disabled and the normally open contacts 164 are closed to thereby energize the up solenoid valve 162. The servo sleeve 32 is thus driven upwardly. Simultaneously, the energization of the relay coil 136 also closes the normally open relay contacts 168 and thereby opens the removal solenoid valve 170 so that hydraulic fluid from the source 166 is applied through the valve 170 to the conduit 72 of the hydraulic removal cylinder 66. With both of the cylinders 36 and 66 actuated, the arm 20 is swung upwardly and away from the cow as illustrated in phantom line fashion in FIG. 1. Depressing the switch 134 restores the arm 20 to its original vertical position by "unlatching" the relay 136.

The hydraulic system, including the solenoid valves 158, 162 and 170 has been described above, for the sake of simplicity, as being of the "one-way" variety, however, it should be apparent to those skilled in the art that it is necessary when charging one portion of either of the cylinders 36 or 66 with pressurized fluid to provide means (not shown) for relieving hydraulic fluid from the other portions of cylinders. One way to accomplish this is to have the solenoid valves be of the "two way" variety so that while one portion of either of the cylinders is being charged, the uncharged portion is vented to a return or exhaust line.

Physical changes often occur in the teats at the end of the milking. Such changes vary from cow to cow because of age, breed and health. In order to compensate for these changes, the system of the invention allows the pulling force exerted by the milking claw, or teat cluster, to be manually or automatically changed at the end of the milking in response to a control signal representative of time duration, milk quantity, milk flowrate, or any other parameter of the milking process. In this embodiment, the positions of the moving contacts of the selector switches 140 and 148 are changed to select a new range of pulling forces. The switches 140 and 148 may be reset manually or automatically by a stepper motor, for example, activated by such a control signal.

While in the above described embodiment a specific construction of the sensor 100 has been given, it should be apparent that in other embodiments it may be replaced with a load cell which gives a proportional output representative of the force exerted on it by the upper arm 22 and the various circuits described in reference to FIG. 5 may be replaced with a comparator which compares the output of the load cell to a predetermined reference voltage which is selected to give a corresponding amount of pull on the cow's udders by the milking claw. Such a comparator then activates the up and down solenoid valves based on this comparison. Such embodiments have the advantage of allowing the selection of a continuous range of pulling force.

In still other embodiments the sensor 100 may be replaced by a position transducer such as a linear variable differential transformer (LVDT) or even a sliding potentiometer in conjunction with a spring in order to generate a signal which is representative of the pull exerted by the milking claw on the cow's udder. In each of these embodiments the sensor would be mounted between the actuator and the milking claw support to sense the downward force exerted by the claw support relative to the vertical position of the actuator. This feature, as in the above described embodiment, allows the pulling force to be pre-selected irrespective of the actual vertical position of the milking claw.

While the pulling force sensors in the above embodiments are described as being mounted between the milking claw (or teat cluster) support arm and the movable vertical support member, in other embodiments the pulling sensor may be located in other positions. For example, in some embodiments the claw support arm may be eliminated and in such an embodiment the pulling force sensor may be located between the teat suction cups and the means utilized to exert the pulling force.

Although the above described invention is preferably operated hydraulically because this results in a more positive acting, stabilized system, in other less desirable embodiments the system may be operated by pneumatic or electromechanical actuators.

In still other embodiments the pulling force sensing means includes means attached to the cow's udder and free to ride with the vertical movements of the udder, which has an adjustable weight (such as a liquid filled bladder). The pulling force is sensed by sensing how much liquid is pumped into or out of the bladder to exert a predetermined weight or pulling force.

Figure 7:
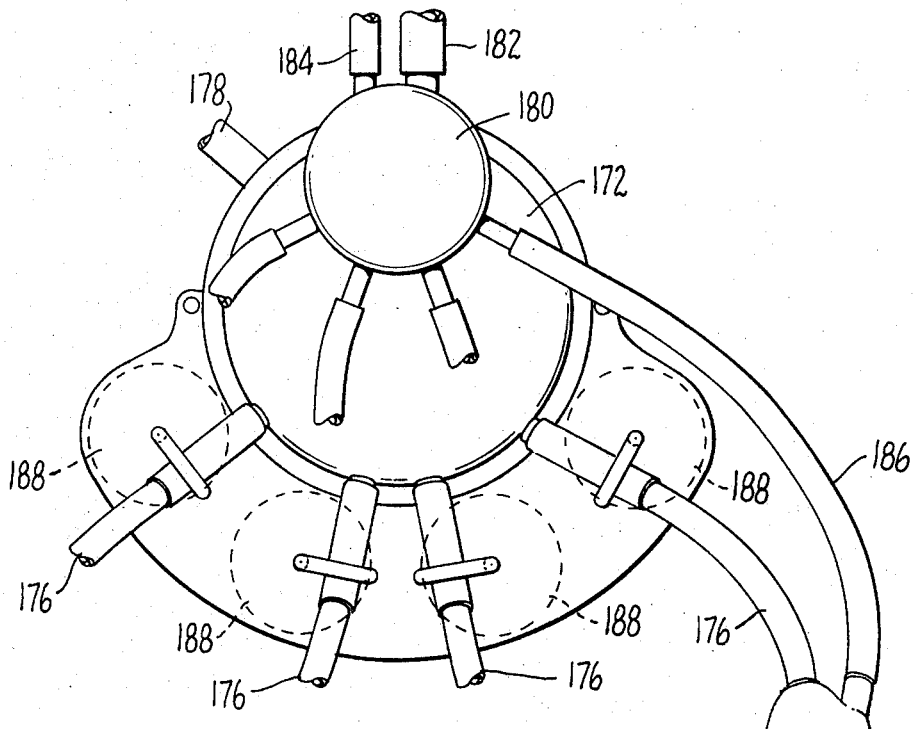
FIG. 7 is a plan view of the embodiment of FIG. 6 with portions broken away.
Figure 6:
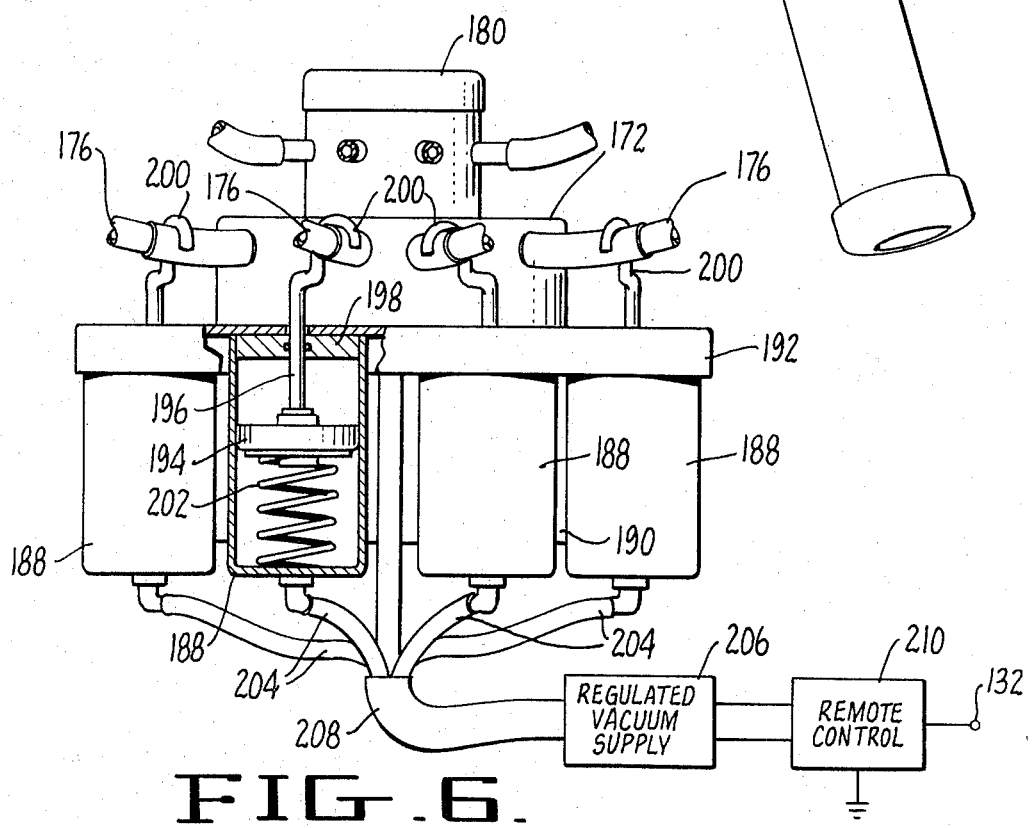
FIG. 6 is a vertical view, partly in section and with portions broken away, of a second embodiment of the invention.

Referring now more particularly to FIGS. 6 and 7, a second embodiment of the invention is illustrated. In this embodiment a constant pull is maintained on the cow's udder by means of individual pneumatic cylinders connected to each teat cup hose rather than through a servo support system for the cluster arm. A milking chamber 172, made of stainless steel or clear or opaque plastic material, for example, of the cow. A plurality of teat cups 174 are connected to the milking chamber through separate milk tubes 176. A hose 178 connects the milking chamber 172 to an evacuated milk line (not shown). A pulsator valve 180 is mounted on top of the milking chamber 172 and is connected through hoses 182 and 184 with a control unit (not shown) mounted on the stall. The pulsator valve 180 is operated by vacuum control signals through the hose 184 to alternately supply a vacuum (from line 182) and air to hoses 186 connected between the inflation chamber in the teat cup 174 and the pulsator valve 180. Under the control of the pulsator valve 180 the inflations within the teat cup 174 are expanded and collapsed to provide alternate milking and rest periods.

A group of four individual cylinder cups 188, made of stainless steel or the like, are clustered about the outer surface of the milking chamber 172 within a casing 190. The top of the casing 190 is fitted with a lid 192. Each of the cylinder cups 188 is associated with a separate teat cup 174. Within each cylinder cup 188 is a piston head 194. The top surface of the piston head 194 is fitted with a rod 196 which extends out of the cylinder cup 188 through a flexible seal 198. The exterior end of each piston rod 196 is shaped in the form of an off-set hook 200 which is engaged over the top of a separate one of the milk tubes 176 of each teat cup 174. Since the hooks 200 are off-set from the piston rods 196, they are freely rotatable so that the hooks do not tend to bind or limit the movement of the teat cups.

A compression spring 202 is fitted within the cylinder cup 188 between the piston head 194 and the closed bottom of the cylinder cup 188. Separate vacuum lines 204 are connected between the bottom of each cylinder cup 188 and an external, regulated vacuum supply 206. The vacuum lines 204 are housed in a multi-passage connecting hose 208.

In operation, the entire assembly in FIGS. 6 and 7 is positioned at the desired height underneath the udder of the cow. The teat cups are attached to the cow's teats. A separate, predetermined pressure differential is created across each individual piston head by the regulated vacuum supply 206 connected to each cylinder cup 188. These predetermined pressure differentials are such that the pistons 194 are drawn downwardly until their hooks 200 engage the milk tubes 176 and thereby exert a predetermined pulling force on the teats through the teatcups and their tubes.

The regulated vacuum supply 206 is designed such that it senses any change in the differential pressure within each cylinder cup 188, caused by one teat moving upwardly, for example, and pulling its associated hook 200 and piston head 194 with it to increase the differential pressure, and automatically compensates for it to restore the predetermined differential pressure within the cylinder cup 188. After the restoration of the predetermined differential pressure the pulling force exerted on the teat associated with that cylinder cup is again at the predetermined desired value.

Similarly, when one of the teats is lowered, the differential pressure within the cylinder cup 188 associated with the lowered teat is decreased and the regulated vacuum supply 206 automatically increases the reduced differential pressure to the predetermined value, thereby restoring the pulling force desired on the lowered teat.

In order that the pulling force may be varied during the milking process, the regulated vacuum supply is remotely controlled by a unit 210. The remote control unit 210 also has one of its inputs connected to the terminal 132 so that when the remove control pulse is received by the milking cluster unit, as described above, the assembly in this second embodiment is activated to strip the teat cups from the cow's udder by pulling the hooks 200 downwardly.

While no vertical support for the assembly described in reference to FIGS. 6 and 7 has been described above, it will be understood that various different support means may be utilized depending on the desired objective of the system. For example, such support means may be rigid supports or hydraulically actuated supports. The support system may even be the servo support system shown and described above in reference to FIGS. 1–5, inclusive, if it is desired to have constant control of the total pulling force applied to the cow's udder.

While the regulated source 206 and the piston head cylinder assemblies 194, 188 have been described above as a vacuum operated system it will be understood that in other embodiments other differential fluid pressure operated actuators and sources may be used with the same effect. For example, in other embodiments the regulated source 206 supplies fluid under a regulated pressure in excess of atmospheric pressure to the opposite side of the piston head 194 from that shown in FIG. 6 and the bottom of the cylinder cup 188 is vented to the atmosphere. The term "fluid" as used above is preferably meant to refer to a gas such as air but in other embodiments a liquid may be used.

In still other embodiments the actuators may be electro-mechanical and the regulated source 206 may be replaced by a regulated power supply together with either means for sensing changes in the power supplied to the actuators or direct sensors connected between each off-set hook 200 and the corresponding actuator member attached to the hook. In such electromechanical embodiments the actuators are controlled to provide a select, substantially constant pulling force through the teat cups despite momentary shifts in position of the teats relative to the actuator.

While the invention has been described as having separate actuators connected to the teat cups through the hoses, in other less advantageous embodiments the actuators may be connected directly to the teat cups themselves.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An improved automated milking system of the type having milking cluster elements attached to the teats of a cow's udder, wherein the improvement comprises means for sensing a change in the pulling forces on the teats of the cow's udder exerted by the cluster elements and for producing an output signal representative of the change in at least one of the pulling forces and means attached to the milking cluster elements and responsive to the output signal for varying the pulling forces of the cluster elements on the cow's teats until the output signal indicates that the pulling forces on the teats exerted by the cluster elements are within a predetermined range.

2. An improved system for supporting a milking cluster attached to the teats of a cow's udder, the system being of the type having variable support means for raising and lowering the cluster, wherein the improvement comprises connecting the variable support means to the cluster, means for sensing a change in the pulling force on the cow's udder exerted by the cluster and for producing an output signal representative of the change in pull, and means responsive to the output signal for activating the variable support means to reposition the cluster with respect to the cow's udder until the output signal indicates that the pulling force on the udder exerted by the cluster is within a predetermined range.

3. An improved system for supporting a milking cluster attached to the teats of a cow's udder, the system being of the type having a cluster support and an actuator slidably attached to the cluster support for adjusting the vertical position of the cluster, wherein the improvement comprises means mounted between the cluster support and the actuator for sensing the pulling force applied to the cow's udder by the cluster and for generating a first signal for so long as the sensed pulling force is substantially within a predetermined range of reference pulling forces, control means responsive to the first signal for energizing the actuator to reposition the cluster support and hence the cluster, so as to strive to maintain the first signal despite temporary variations in the pulling force applied by the cluster to the cow's udder.

4. An improved system for supporting a milking cluster as recited in claim 3 further comprising means for selecting the predetermined range of pulling forces from a plurality of such ranges.

5. An improved system for supporting a milking cluster as recited in claim 4 wherein the predetermined range of pulling forces may be changed at any time during the milking.

6. An improved system for supporting a milking cluster attached to the teats of a cow's udder, the system being of the type having a cluster support and an actuator attached to the cluster support for adjusting the vertical position of the cluster, wherein the improvement comprises means mounted between the cluster support and the actuator for sensing any force applied by the cluster to the cow's udder and for generating a signal representative of the sensed force, control means responsive to the signal for energizing the actuator to reposition the cluster support and hence the cluster, so as to strive to maintain the signal at a predetermined value representative of a preselected reference force despite temporary variations in the force applied by the cluster to the cow's udder due to movement of the udder.

7. An improved system for supporting a milking cluster attached to the teats of a cow's udder, the system being of the type having a cluster support and an actuator member slidably attached to the cluster support for adjusting the vertical position of the cluster, wherein the improvement comprises means mounted between the cluster support and the actuator member for sensing the downward pulling force relative to the actuator member applied by the cluster to the cow's udder and for generating a first signal for so long as the sensed pulling force is at least as great as a first desired pulling force, and control means connected to the pulling force sensing means for energizing the actuator member to reposition the cluster support, and hence the cluster, upwardly to normally maintain the presence of the first signal.

8. An improved system for supporting a milking cluster as recited in claim 7 wherein the pulling force sensing means generates a second signal whenever the relative pulling force exerted by the cluster on the cow's udder falls below a second predetermined reference pulling force and the control means includes means responsive to the second signal for energizing the actuator member to reposition the cluster support, and hence the cluster, downwardly until the second signal ceases.

9. An improved system for supporting a milking cluster as recited in claim 8 wherein the cluster support includes an arm, the actuator member is a hollow sleeve mounted co-axially with respect to one end of the arm, and the pulling force sensing means is resiliently mounted between the one end of the arm and the actuator sleeve.

10. An improved system for supporting a milking cluster as recited in claim 9 wherein the pulling force sensing means comprises a common electrode, a plurality of resilient electrodes, and electrode support means attached to the one end of the cluster support arm and the actuator sleeve for variably spacing the common electrode from the plurality of electrodes in proportion to the force exerted on the cluster support arm through the cluster by the cow's udder, with some of the plurality of resilient electrodes being at staggered distances from the common electrode, and the control means is electromechanical and is connected to the common electrode and a first and second one of the plurality of staggered electrodes, the control means energizing the actuator sleeve to move the cluster support arm upwardly until the first electrode electrically connects with the common electrode, thereby generating the first electrical signal and energizes the actuator sleeve to move the cluster support arm downwardly whenever the second electrode electrically connects with the common electrode and thereby generates the second electrical signal.

11. An improved system for supporting a milking cluster as recited in claim 10 wherein the control means includes a source of fluid under pressure, an up solenoid valve operatively connected between the fluid source and the actuator sleeve so as to control the flow of fluid to energize the actuator sleeve upwardly, a down solenoid valve operatively connected between the fluid source and the actuator sleeve so as to control the flow of fluid to energize the actuator sleeve downwardly, an electrical source having two terminals, the common electrode being connected to one of the electrical source terminals, a normally open relay switch connected in series with the up solenoid valve between the electrical source terminals, means for closing the relay switch in response to an electrical signal, switch means for connecting the down solenoid valve in series between the other electrical source terminal and one of a selected pair of the staggered electrodes, and for connecting the other electrode of the selected pair of staggered electrodes to the relay switch closing means.

12. An improved automated milking system of the type having a milk chamber, individual teat cups connected by hoses to the milk chamber and fitted on the cow's teats, wherein the improvement comprises separate actuators corresponding to each teat cup, each actuator including a movable member attached to the corresponding teat cup so as to exert a select, predetermined pulling force on the teat cup when the actuator is energized, means for separately sensing temporary changes in the pulling force exerted on each teat due to a shift in position of the teat and for changing the energization of the actuator to reestablish the predetermined pulling force.

13. An improved automated milking system as recited in claim 12 wherein the actuators are fluid operated, piston head cylinder assemblies, the piston head having a hook shaped extension which is attached to one of the teat cups, and the sensing means is a regulated source for maintaining a predetermined fluid pressure differential across the actuator piston head which is representative of a predetermined pulling force despite shifts in position of the piston head relative to its associated cylinder due to changes in position of the associated teat.

14. A method of controlling the vertical position of an actuator supported, automated milking cluster attached to the teats on an udder of a cow comprising the steps of sensing the pulling force on the cow's udder exerted by the cluster and energizing the actuator in response to sensed changes in the pulling force to reposition the milking cluster with respect to the cow's udder so as to stabilize the pulling force within a preselected range of values.

15. A method of controlling the vertical position of an actuator supported, automated milking cluster as recited in claim 14 wherein the step of sensing the pulling force comprises the step of detecting the vertical position of the cluster relative to the actuator.

16. A method of controlling the vertical position of an actuator supported, automated milking cluster as recited in claim 15 wherein the step of sensing the pulling force comprises generating a first signal for so long as the sensed pulling force is at least as great as a first preselected pulling force and a second signal whenever the sensed pulling force falls below a second preselected pulling force.

17. A method of controlling the vertical position of an actuator supported, automated milking cluster as recited in claim 16 wherein the step of energizing the actuator comprises energizing the actuator to reposition the milking cluster upwardly whenever the first signal is not being generated and energizing the actuator to reposition the milking cluster downwardly whenever the second signal is being generated.

18. A method of controlling the pulling force on a cow's teats by an automatic milking device comprising the steps of attaching the milking device to the teats of the cow's udder and adding and subtracting measured amounts of weight to the milking device.

* * * * *